United States Patent
Wainblat et al.

(10) Patent No.: US 10,664,612 B2
(45) Date of Patent: May 26, 2020

(54) SYSTEM AND METHOD FOR CONTROLLING OPERATIONS PERFORMED ON PERSONAL INFORMATION

(71) Applicant: Unbound Tech Ltd., Petah Tiqva (IL)

(72) Inventors: George Wainblat, Tel Mond (IL); Oz Mishli, Kfar Saba (IL)

(73) Assignee: UNBOUN TECH LTD., Petah Tiqva (IL)

( * ) Notice: Subject to any disclaimer, the term of this patent is extended or adjusted under 35 U.S.C. 154(b) by 0 days.

(21) Appl. No.: 16/155,392

(22) Filed: Oct. 9, 2018

(65) Prior Publication Data
US 2020/0110897 A1    Apr. 9, 2020

(51) Int. Cl.
*H04L 29/06* (2006.01)
*G06F 21/62* (2013.01)
*H04L 9/08* (2006.01)

(52) U.S. Cl.
CPC .......... *G06F 21/6245* (2013.01); *H04L 9/088* (2013.01); *H04L 9/0894* (2013.01)

(58) Field of Classification Search
CPC ................................................. G06F 21/6245
USPC ......................................................... 713/164
See application file for complete search history.

(56) References Cited

U.S. PATENT DOCUMENTS

| | | | | |
|---|---|---|---|---|
| 8,914,635 | B2* | 12/2014 | Parrish | H04L 63/061 380/277 |
| 9,521,124 | B2* | 12/2016 | Raykova | H04L 9/008 |
| 10,097,522 | B2* | 10/2018 | Philipp | H04L 67/1097 |
| 2010/0100724 | A1* | 4/2010 | Kaliski, Jr. | H04L 9/3013 713/155 |
| 2010/0316218 | A1* | 12/2010 | Hatakeyama | H04L 63/06 380/255 |
| 2014/0010371 | A1* | 1/2014 | Khazan | G06F 21/602 380/278 |
| 2014/0108435 | A1* | 4/2014 | Kolesnikov | G06F 7/24 707/754 |
| 2016/0149878 | A1* | 5/2016 | Pogorelik | H04L 9/085 380/283 |
| 2016/0330018 | A1* | 11/2016 | Miyata | H04L 9/0625 |
| 2017/0140174 | A1* | 5/2017 | Lacey | G06F 21/6245 |
| 2017/0243028 | A1* | 8/2017 | LaFever | G06F 21/6254 |
| 2017/0359321 | A1* | 12/2017 | Rindal | H04L 63/0471 |
| 2018/0034810 | A1* | 2/2018 | Pe'er | H04W 12/04033 |

(Continued)

*Primary Examiner* — Harris C Wang
(74) *Attorney, Agent, or Firm* — Gearhart Law, LLC (57) ABSTRACT

The subject matter discloses a method for securing personal information, comprising securing the personal information stored on a data server using a cryptographic secret, said cryptographic secret is unique to a user, storing a first share of the cryptographic secret on a secret storage server communicating with the data server and a second share of the cryptographic secret on a computerized device controlled by the user, detecting a request from the data server to perform an action on the personal information, transmitting the request to the computerized device controlled by the user to use the second share of the cryptographic secret to decrypt the personal information, decrypting the personal information using the first share and the second share, without storing both the first share and the second share in a single device concurrently and performing the action on the personal information on the data server.

10 Claims, 4 Drawing Sheets

(56) References Cited

U.S. PATENT DOCUMENTS

| | | | |
|---|---|---|---|
| 2018/0144148 A1* | 5/2018 | Rattan | G06F 21/602 |
| 2018/0248692 A1* | 8/2018 | Henderson | H04L 9/0869 |

\* cited by examiner

SYSTEM AND METHOD FOR CONTROLLING OPERATIONS PERFORMED ON PERSONAL INFORMATION

FIELD OF THE INVENTION

The present disclosure generally relates to handling personal information, and more particularly relates to controlling operations performed on personal information stored on servers associated with commercial businesses.

BACKGROUND OF THE INVENTION

People and organizations are required to store personal information on servers owned by or controlled by commercial businesses such as banks, service providers, e-commerce websites and the like. The term commercial business also includes government agencies which offer goods or services to the person. The personal information includes personal as defined below. The personal information also includes action-based information, such as prior actions the person performed versus the commercial business, person's behavior as a user of the commercial business, dates of such actions and the like. The commercial businesses may keep the private information for multiple reasons, such as reducing legal liabilities, extracting business information from the action-based information and the like.

There are legal developments which limit the use of the personal information by the commercial businesses. One example of the legal development in General Data Protection Regulation (GDPR) which came into effect in Europe during 2018. The GDPR dictates multiple limitations on the manner of using the personal information by the commercial businesses, for example enabling users to control the personal information, for example via "the right to be forgotten", which is defined technically by the user's ability to ask for deletion of his/her personal information from the servers controlled by the commercial business.

Some data security solutions address the new legal development, such as GDPR, for example strong authentication and data encryption products offerings enable commercial businesses to secure access to online resources and protect the digital interactions of employees, partners, and customers. Yet, these solutions fail to transfer control of the data from the commercial businesses to the users.

SUMMARY OF THE INVENTION

It is an object of the subject matter to disclose a method for securing personal information, comprising securing the personal information stored on a data server using a cryptographic secret, said cryptographic secret is unique to a user associated with the personal information at the data server, storing a first share of the cryptographic secret on a secret storage server communicating with the data server and a second share of the cryptographic secret on a computerized device controlled by the user associated with the personal information, detecting a request from the data server to perform an action on the personal information, transmitting the request to the computerized device controlled by the user to use the second share of the cryptographic secret to decrypt the personal information, decrypting the personal information using the first share and the second share, without storing both the first share and the second share in a single device concurrently and performing the action on the personal information on the data server.

In some cases, the secret storage server is included in the data server. In some cases, the method further comprises transmitting a usage indication from the data center to the computerized device controlled by the person, said usage indication comprises an identifier of the action performed by the data server on the personal information associated with the user controlling the computerized device.

In some cases, the method further comprises receiving a command to delete the second share of the cryptographic secret from the computerized device and deleting the second share of the cryptographic secret from the computerized device. In some cases, the method further comprises sending a deletion indication to the data server, indicating that the second share of the cryptographic secret was deleted from the computerized device.

The method according to claim 1, wherein the data server cannot perform actions on the personal information after deletion of the second share of the cryptographic secret from the computerized device. In some cases, the method further comprises generating the first share and the second share of the cryptographic secret and transmitting the first share to the data server and the second share to the computerized device.

In some cases, the data server stores multiple cryptographic secret shares, each of the multiple cryptographic secret shares is unique to each of a multiple persons who inputted information into the data server. In some cases, the computerized device controlled by the user is an electronic device owned by the user.

In some cases, the computerized device controlled by the user is a web server configured to store multiple cryptographic secret shares, each of the multiple cryptographic secret shares is associated with a specific user of multiple users, said web server is configured to enable access to a specific share of the multiple cryptographic secret shares upon a request received from an electronic device owned by the user.

It is an object of the subject matter to disclose a data server, comprising a memory storage, configured to store personal information inputted by multiple persons registered to the data server, an cryptographic secret storage, configured to store multiple encryption key shares used to decrypt data units of the personal information inputted by the multiple persons, wherein each of the multiple encryption key shares is associated with an identifier of a user of the multiple users registered to the data server, a processing module configured to identify a request to perform an action on the personal information inputted by a specific user of the multiple users registered to the data server and a communication module configured to transmit the request to a computerized device controlled by the specific user of the multiple users registered to the data server.

In some cases, the communication module is further configured to receive information required to decrypt the personal information associated with the specific user without sending the second key share to the data server. In some cases, the communication module is further configured to transmit a usage indication to the computerized device after performing the action on the personal information inputted by the specific user. In some cases, the usage indication comprises an identifier of the action performed on the personal information inputted by the specific user.

BRIEF DESCRIPTION OF THE DRAWINGS

The invention may be more clearly understood upon reading of the following detailed description of non-limiting exemplary embodiments thereof, with reference to the following drawings, in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

Illustrative embodiments of the invention are described below. In the interest of clarity, not all features/components of an actual implementation are necessarily described.

The present invention discloses a method of using a multi-party computation (MPC) in order to provide an end user control of personal information stored on a data server controlled by a commercial business. The personal information may be inputted into the data server of the commercial business by the user, or by a third party. The personal information is defined as information relating to an identified or identifiable natural person. An identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. The personal information may also comprise history of the user versus the commercial business, such as transactions, payment methods, interest in content suggested by the commercial business, reactions to content suggested by the commercial business, cookies and the like.

The MPC process is used to both encrypt and decrypt the personal information stored in the data server controlled by the commercial business. The MPC process utilizes a first cryptographic secret share stored on a server accessible to the data server and a second cryptographic secret share stored on the user's device, such as cellular phone, tablet, laptop, personal computer and the like. In some exemplary cases, the MPC process is performed between more than two entities. During the MPC process, information is exchanged between the data server and the user's device in order to perform cryptographic operations such as encrypt or decrypt the personal information, without ever storing both shares of the cryptographic secret in a single entity. The cryptographic secret used to encrypt the personal information is unique to the user who inputted the information stored at the data server. The personal information is stored in an encrypted manner in the data server. When the data server requests to perform a task on the personal information, such as verify the user's credit card number, at least a portion of the personal information needs to be decrypted. Thus, the data server requires the user's consent to perform any action on the personal information, as the cryptographic secret share stored on the user's device is required to decrypt the personal information. In addition, when the user wishes to be forgotten from the data server of the commercial business, the user deletes the cryptographic secret share from the user's device and the data server cannot use the personal information associated with the specific user.

Figure 1A:
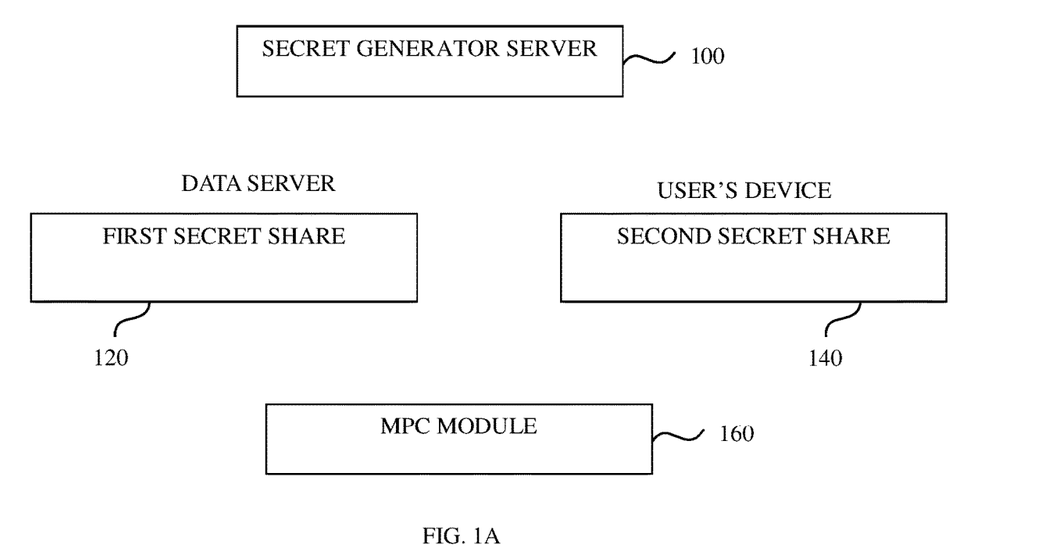
FIG. 1A discloses a computerized environment having a user's device communicating with a data server of a commercial business storing the user's personal information, according to exemplary embodiments of the subject matter.

FIG. 1A discloses a computerized environment having a user's device communicating with a data server of a commercial business storing the user's personal information, according to exemplary embodiments of the subject matter. The computerized environment comprises a data server 120 controlled by the commercial business. The commercial business may be a business that offers goods and/or services to the user. The goods and/or services may be offered for any type of compensation, for example money, labor, information, block-chain based transactions and the like. The goods and/or services may be offered for no compensation, for example the business model of social networks such as Facebook, LinkedIn and others. The service may be a messaging service or an email service. The commercial business stores personal information of one or more users in the data server 120. The personal information may be used to enable the commercial business to perform actions versus the user. The actions may be contacting the user via contact details inputted by the user, verifying a financial transaction, verifying transmission of a data item associated with the user, using prior transactions or user's reactions to create a behavior profile of the user and the like.

The data server 120 also comprises a first share of the cryptography secret used to perform the MPC process required to encrypt and decrypt the personal information stored in the data server 120. The cryptography secret may be a cryptography key or any value, string, character, cipher and the like, used to encrypt and/or decrypt information in a cryptographic manner. The data server 120 also comprises a communication module configured to exchange information with the user's device 140, at least when performing the MPC process for encrypting and decrypting the personal information stored in the data server 120. The communication module of the data server 120 may also be configured to exchange information with a secret generator module 100 configured to send the first share of the cryptography secret to the data server 120. The communication module of the data server 120 may also be configured to exchange information with a MPC module 160 configured to encrypt the personal information using the first share of the cryptography secret stored in the data server 120 and the second share of the cryptography secret stored in the user's device 140.

The computerized environment also comprises a secret generator module 100. The key generator module 100 is configured to generate cryptography secrets used to encrypt and decrypt personal information stored in the data server 120. The key generator module 100 is configured to communicate with the data server 120 and the user's device 140, and send a first share of the cryptography secret to the data server 120 and a second share of the cryptography secret to the user's device 140. The key generator module 100 is configured to delete the entire cryptography secret after dividing the cryptography secret into the two shares and sending the shares. Yet, the key generator module 100 is configured to generate a unique cryptography secret upon request from the data server 120. Such request may be initiated in response to a new user registering into the data server 120, or at another entity associated with the commercial business controlling the data server 120.

The user's device 140 may be any electrical device enabling a user to communicate with a web-based server such as the data server 120. The user's device 140 may be defined by one of multiple devices via which the same user may communicate with the data server 120 under a unique identifier, such as a username. The user's device 140 comprises a storage device configured to store a second share of the cryptographic secret used to encrypt and/or decrypt the personal information associated with the user of the user's device 140. The user's device 140 also comprises a user interface configured to receive information and/or commands used to communicate with the web server 120. The user interface may enable the user of the user's device 140 to input a command to delete the second share of the cryptographic secret. Deletion of the second share of the cryptographic secret from the user's device 140 renders the personal information stored at the data server 120 useless, as the personal information cannot be decrypted.

Figure 1B:
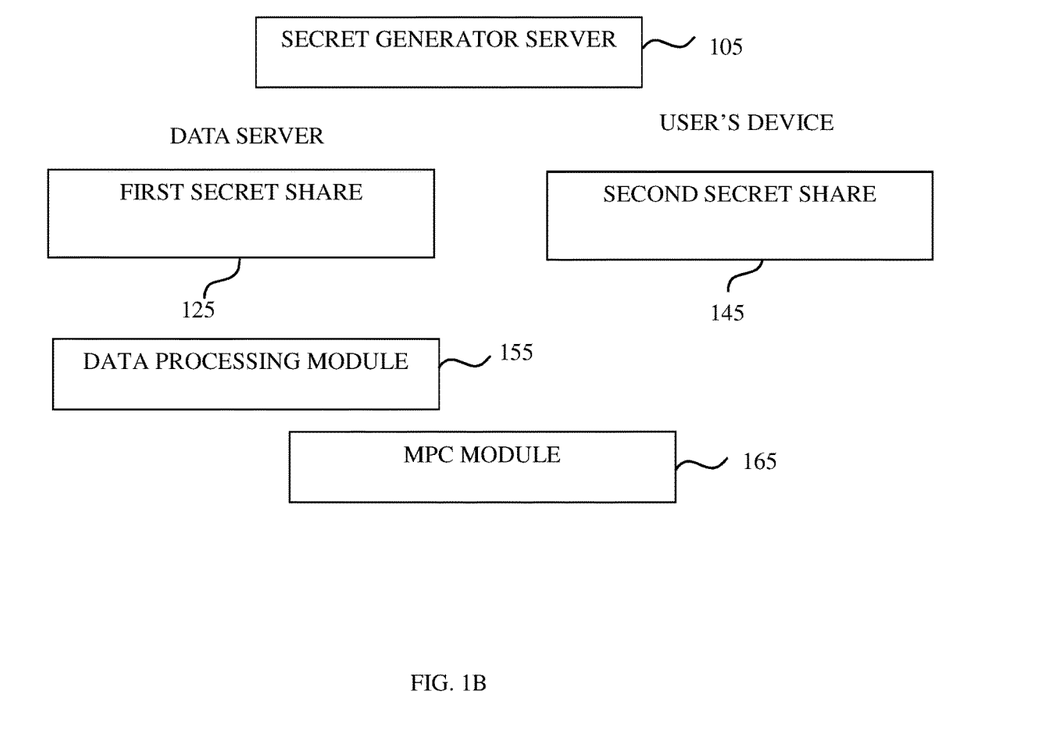
FIG. 1B discloses a computerized environment having a user's device communicating with a data server of a commercial business storing the user's personal information and a data processing module external to the data server, according to exemplary embodiments of the subject matter.

FIG. 1B discloses a computerized environment having a user's device communicating with a data server of a commercial business storing the user's personal information and a data processing module external to the data server, according to exemplary embodiments of the subject matter. The computerized environment is substantially identical to the environment of FIG. 1A, only that the data server 125 does not perform the actions on the personal information, such as processing the personal information. The processing is performed using data processing module 155, configured to exchange information with the data server 125. For example, the data processing module 155 the requests personal information about a specific user from the data server. Then, the data server sends a request to the MPC module 165 to decrypt the personal information about the specific user. The MPC module 165 exchanges information with both the data server 125 and the user's device 145 in order to access the first share and the second share of the cryptographic secret to decrypt the personal information about the specific user. The first share and the second share of the cryptographic secret are generated by the key generator module 105 as disclosed above.

Figure 2:
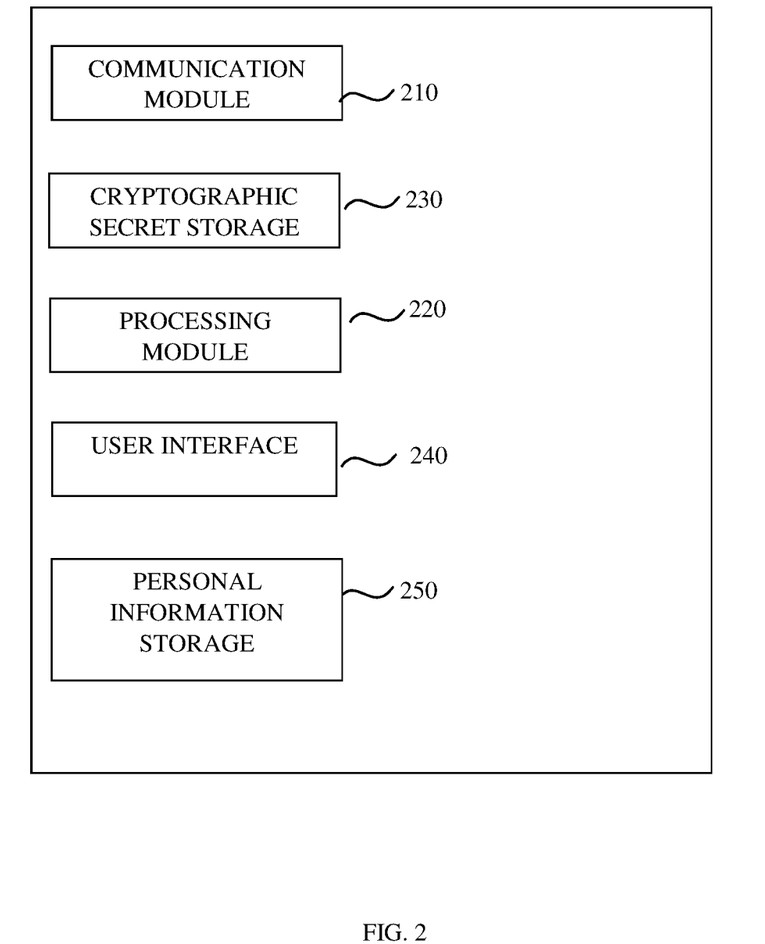
FIG. 2 discloses a web server for storing the user's personal information and requiring the user's approval to perform actions on the user's personal information, according to exemplary embodiments of the subject matter.

FIG. 2 discloses a data server for storing the user's personal information and requiring the user's approval to perform actions on the user's personal information, according to exemplary embodiments of the subject matter. The data server may be a web server to which users input information using the internet. The data server may function via a private network such as LAN, WAN and the like.

The data server comprises a personal information storage 250 configured to store personal information of one or more users of the data server. The personal information may be inputted directly by the users or inputted via a third party, for example a credit card service used by the users may provide financial credibility information of the users. The personal information stored in the personal information storage 250 is encrypted using a cryptography secret, such as an encryption key. The cryptography secret used to encrypt personal information in the personal information storage 250 is unique to each user. For example, the personal information storage 250 may comprise lists #1-22 associated with user #1 and lists 23-29 associated with user #2. Lists #1-22 are encrypted using a first cryptography secret and lists 23-29 are encrypted using a second cryptography secret. When a third user registers into the data server, the secret generator server 110 generates a third cryptographic secret to be used only to the lists associated with the third user.

The data server comprises a processing module 220 configured to process the personal information stored in the personal information storage 250. When the processing module 220 detects a need to process the personal information, the processing module 220 sends a command to the communication module 210 to decrypt a specific data field encrypted with a unique cryptographic secret associated with a specific user associated with the specific data field. The command to the communication module 210 may also comprise an identifier of the specific data field to be decrypted and an identifier of the specific user associated with the specific data field. An identifier of the specific user may enable the communication module 210 to use contact details of the specific user as inputted into the data server. Such contact details may be an email address, phone number, IP address, instant messaging account and the like. The communication module 210 may return a decrypted version of the specific data field after completion of the MPC process on the encrypted specific data field, using the MPC module disclosed above. The processing module 220 may perform the action on the decrypted specific data field, then indicate to the communication module 210, which then sends a usage indication to the user's device.

The data server comprises a communication module 210 configured to exchange information with the user's device as noted above. The communication module 210 may comprise a transmitter and a receiver. The communication module 210 may comprise an internet gateway, enabling the data server to receive messages provided via the internet or intranet, for example via a website into which the users of the data server input personal information, commands and the like. The communication module 210 may exchange information with the MPC module described above, for example in order to encrypt and/or decrypt information stored in the personal information storage 250 of the data server.

The data server comprises a cryptographic secret storage 230 configured to store a share of the cryptographic secrets used to encrypt and decrypt the personal information stored in the personal information storage 250. The cryptographic secrets stored in the cryptographic secret storage 230 are unique to a specific user of the data server, or a user of the commercial business controlling the data server. For example, a retail company without any online operation stores the user's details after the user purchased goods at the retail store of the retail company. Each time the retail company wishes to perform an action on the personal information of the specific user, the processing module 220 may request a share of the cryptographic secret of the specific user from the cryptographic secret storage 230. Then, the communication module 210 will exchange information with the user's device in order to decrypt the information required by the processing module 220 in order to perform the action.

The data server may also comprise a user interface 240 configured to enable a user to input personal information into the server. The user interface 240 may interact with an input module in the user's device, such as a keyboard, mouse and the like. The user interface 240 may comprise menus from which the user selects options, titles and empty fields configured to be filled with personal information, such as name, contact details, preferences, financial related information such as bank account, credit card number, credit level and the like.

Figure 3:
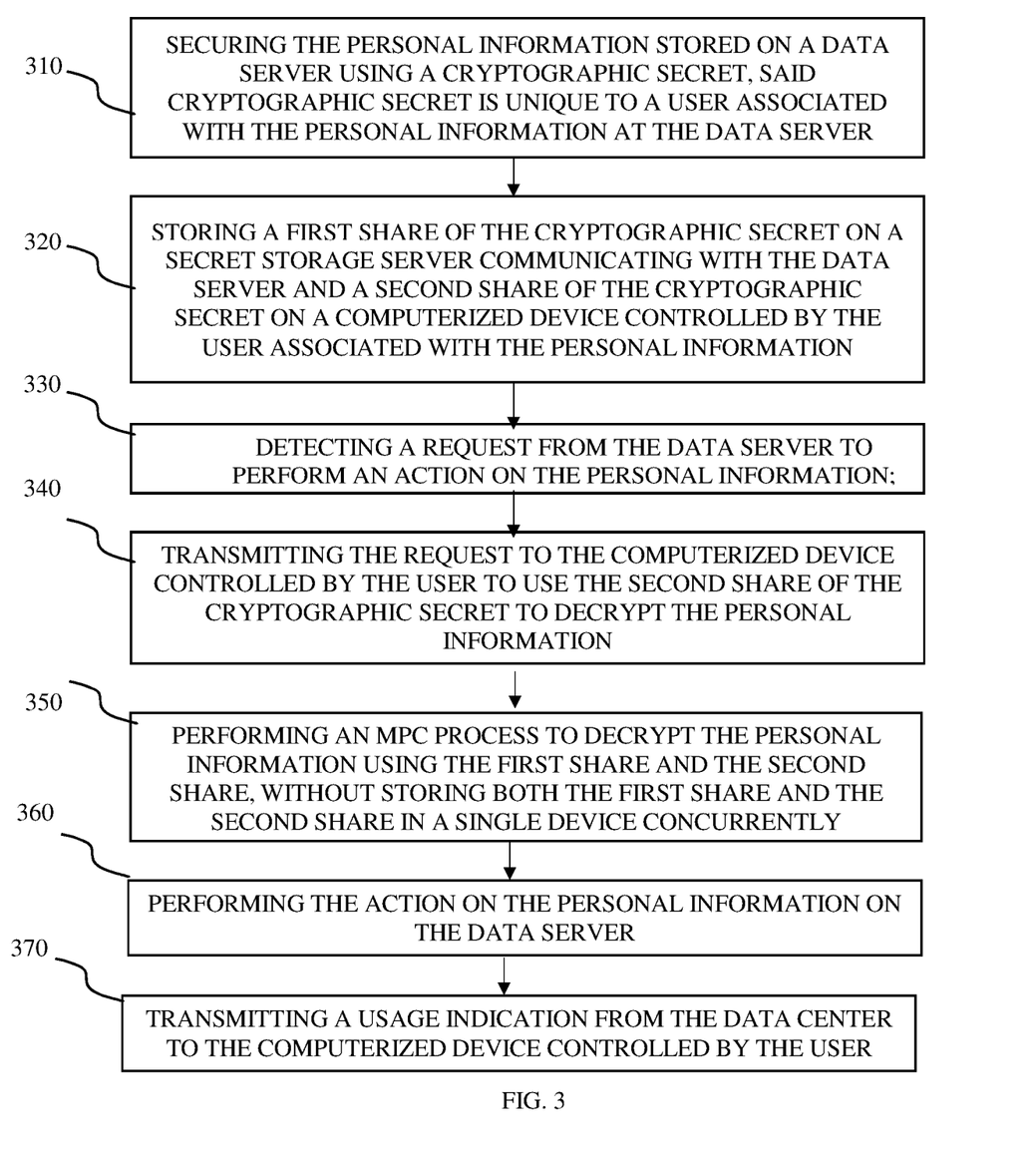
FIG. 3 discloses a method of performing actions on the user's personal information responsive to receiving the user's consent or informing the user on said action, according to exemplary embodiments of the subject matter; and, FIG. 4 discloses a method for preventing the data server from performing actions on the user's personal information, according to exemplary embodiments of the subject matter.

FIG. 3 discloses a method of performing actions on the user's personal information responsive to receiving the user's consent or informing the user on said action, according to exemplary embodiments of the subject matter.

Step 310 discloses securing the personal information stored on a data server using a cryptographic secret. The cryptographic secret may be an encryption key desired by a person skilled in the art. The cryptographic secret may be generated by a secret generation module communicating with the data server. The cryptographic secret is unique to a user associated with the personal information at the data server. Such association may be in case the use inputted the personal information into the data server or in case the commercial business controlling the data server inputted the personal information after the user performed an action, such as purchasing goods or services from the commercial business, reviewing content of the commercial business, requesting additional information about goods or services suggested by the commercial business and the like.

Step 320 discloses storing a first share of the cryptographic secret on a secret storage server communicating with the data server and a second share of the cryptographic secret on a computerized device controlled by the user, such as the user's device or a dedicated web server as detailed below. The cryptographic secret is created in a split manner, such that the entire cryptographic secret is never stored in a single entity during creation and use of the cryptographic secret. Thus, in order to access the plain personal information, the personal information should be decrypted using the first share and the second share of the cryptographic secret. The server which generates the unique cryptographic secrets per new user of the data server stores characteristics of the cryptographic secrets, but not the cryptographic secrets themselves, to prevent creation of a cryptographic secret already used to secure personal information of another user of the data server.

Step 330 discloses detecting a request from the data server to perform an action on the personal information. Such action may be completion of a transaction, frequent update of the user's details and the like. Such request may be received from a remote server or may be generated from the data server storing the personal information. The request may be generated frequently, for example once every month, or in response to a predefined event.

Step 340 discloses transmitting a usage request to the computerized device controlled by the user to use the second share of the cryptographic secret to decrypt the personal information. The request may comprise an indication to the usage requested to be performed by the data server and the data items required to be decrypted in order to perform the action. The request may be sent as an email message, as an SMS message, or as a notification into a dedicated software application installed on the user's device. The user may input a feedback concerning the request into the user's device. Such feedback may be consent to use the personal information, decline to use the personal information or a conditioned consent, for example use the information only on the data server and not expose the information to a third party. The user's feedback is sent from the user's device to the data server. The computerized device controlled by the user may be the user's device, such as laptop, tablet, cellular phone and the like. in some other cases, the computerized device controlled by the user is a web server configured to store multiple cryptographic secret shares, each of the multiple cryptographic secret shares is associated with a specific user of multiple users, said web server is configured to enable access to a specific share of the multiple cryptographic secret shares upon a request received from an electronic device owned by the user.

Step 350 discloses performing an MPC process to decrypt the personal information using the first share and the second share, without storing both the first share and the second share in a single device concurrently. The MPC process may be performed by an MPC server communicating with both the user's device and the data server. The MPC process is performed by exchanging information between the MPC process, the user's device and the data server. The output of the MPC process is a plain data field, in a decrypted accessible format, sent to the data server.

Step 360 discloses performing the action on the personal information on the data server. After the action is performed, the data fields which were decrypted are again encrypted using the MPC process. The MPC server may allocate a predefined period of time between decryption of the data fields and encryption of the data fields, to verify that the data fields are regularly stored in an encrypted format on the data server.

Step 370 discloses transmitting a usage indication from the data center to the computerized device controlled by the person. The usage indication may comprise the action type performed and a verification that the data fields are again encrypted. The usage indication also comprises detection of data breach of the personal information.

Figure 4:
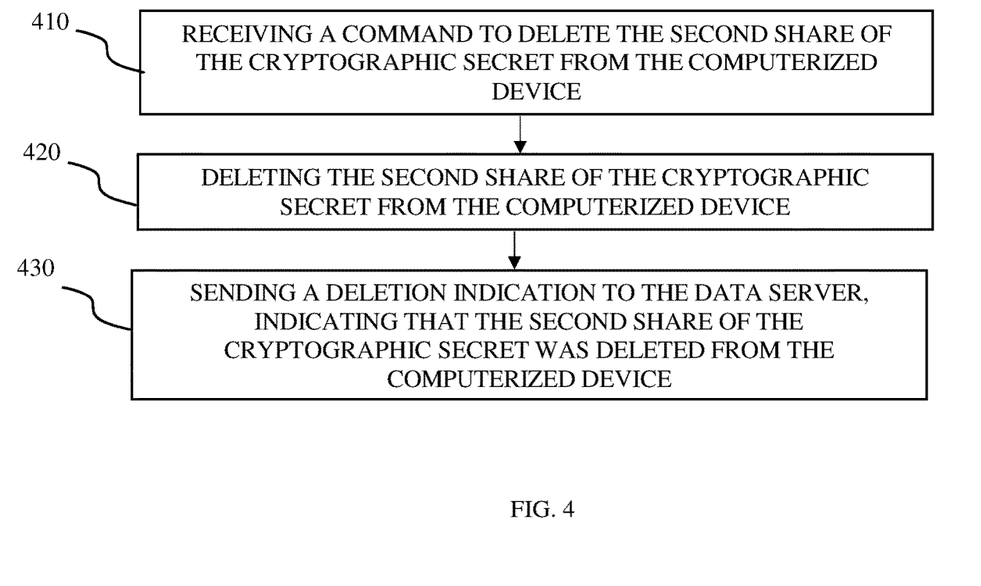

FIG. 4 discloses a method for preventing the data server from performing actions on the user's personal information, according to exemplary embodiments of the subject matter.

Step 410 discloses receiving a command to delete the second share of the cryptographic secret from the user's device. The command may be inputted into a user interface of an application operating on the user's device. The application controls the memory address in which the second share of the cryptographic secret is stored. Upon receipt of the deletion command, the application deletes the second share of the cryptographic secret from the user's device, as disclosed in step 420.

Step 430 discloses sending a deletion indication to the data server, indicating that the second share of the cryptographic secret was deleted from the user's device. This step is optional only, as the user is not required to inform the commercial business about the personal information availability to the commercial business.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for securing personal information, comprising:

securing the personal information stored on a data server using a cryptographic secret, said cryptographic secret is unique to a user associated with the personal information at the data server, wherein the personal information comprises multiple data fields, each data field of the multiple data fields is encrypted using a unique secret;

storing multiple first shares of the cryptographic secrets associated with the multiple data fields on a secret storage server communicating with the data server and storing multiple second shares of the cryptographic secrets associated with the multiple data fields on a computerized device controlled by the user associated with the personal information;

detecting a request from the data server to perform an action on a specific data field of the personal information;

transmitting the request to the computerized device controlled by the user to use the second share of the cryptographic secret to decrypt the specific data field of the personal information and receiving the user's consent to send a second share of the unique secret associated with the specific data field;

decrypting the specific data field of the personal information using the first share and the second share, without storing both the first share and the second share in a single device concurrently;

performing the action on the specific data field of the personal information on the data server.

2. The method according to claim 1, wherein the secret storage server is included in the data server.

3. The method according to claim 1, further comprises transmitting a usage indication from the data center to the computerized device controlled by the person, said usage indication comprises an identifier of the action performed by the data server on the specific data field of the personal information associated with the user controlling the computerized device.

4. The method according to claim 1, further comprises receiving a command to delete the second share of the cryptographic secret from the computerized device and deleting the second share of the cryptographic secret from the computerized device.

5. The method according to claim 1, further comprises sending a deletion indication to the data server, indicating that the second share of the cryptographic secret was deleted from the computerized device.

6. The method according to claim 1, wherein the data server cannot perform actions on the personal information after deletion of the second share of the cryptographic secret from the computerized device.

7. The method according to claim 1, further comprises generating the first share and the second share of the cryptographic secret and transmitting the first share to the data server and the second share to the computerized device.

8. The method according to claim 1, wherein the data server stores multiple cryptographic secret shares, each of the multiple cryptographic secret shares is unique to each of a multiple persons who inputted information into the data server.

9. The method according to claim 1, wherein the computerized device controlled by the user is an electronic device owned by the user.

10. The method according to claim 1, wherein the computerized device controlled by the user is a web server configured to store multiple cryptographic secret shares, each of the multiple cryptographic secret shares is associated with a specific user of multiple users, said web server is configured to enable access to a specific share of the multiple cryptographic secret shares upon a request received from an electronic device owned by the user.

* * * * *